United States Patent
Eguchi et al.

(10) Patent No.: US 11,927,233 B2
(45) Date of Patent: Mar. 12, 2024

(54) LEAF SPRING DEVICE

(71) Applicant: NHK SPRING Co., Ltd., Yokohama (JP)

(72) Inventors: Takashi Eguchi, Yokohama (JP); Yusuke Tanaka, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 17/779,660

(22) PCT Filed: Nov. 27, 2020

(86) PCT No.: PCT/JP2020/044143
§ 371 (c)(1),
(2) Date: May 25, 2022

(87) PCT Pub. No.: WO2021/107070
PCT Pub. Date: Jun. 3, 2021

(65) Prior Publication Data
US 2022/0412420 A1    Dec. 29, 2022

(30) Foreign Application Priority Data

Nov. 27, 2019   (JP) .................................. 2019-214204

(51) Int. Cl.
*F16F 1/18*     (2006.01)
*F16F 3/02*     (2006.01)

(52) U.S. Cl.
CPC .............. *F16F 1/182* (2013.01); *F16F 3/023* (2013.01); *F16F 2230/0005* (2013.01); *F16F 2238/022* (2013.01)

(58) Field of Classification Search
CPC .. F16F 1/368; F16F 1/3683; F16F 1/82; F16F 3/02; F16F 3/023; F16F 2230/0005; F16F 2238/02; F16F 2238/022
See application file for complete search history.

(56) References Cited

U.S. PATENT DOCUMENTS 1,330,923 A    2/1920  Utz
2,073,338 A *  3/1937  Durkee ................. F16L 37/123
                                              285/382.2

(Continued)

FOREIGN PATENT DOCUMENTS

CN    201291728 Y    8/2009
CN    101870238 A   10/2010

(Continued)

OTHER PUBLICATIONS

International Search Report for International Application No. PCT/JP2020/044143; dated Jan. 12, 2021.

(Continued)

*Primary Examiner* — Vishal R Sahni
(74) *Attorney, Agent, or Firm* — CANTOR COLBURN LLP

(57) ABSTRACT

A leaf spring device includes a plurality of leaf springs, in which a restricting protrusion is provided on one leaf spring, a recessed part is formed on the other leaf spring, a first side surface of the restricting protrusion and a third side surface of the recessed part face each other in a plate width direction, a second side surface of the restricting protrusion and a fourth side surface of the recessed part face each other in the plate width direction, a first inclined surface is formed on one of the first and third side surfaces to be further away from the other thereof from a central portion toward a first direction, and a second inclined surface is formed on one of the second and fourth side surfaces to be further away from the other thereof from the central portion toward a second direction.

6 Claims, 6 Drawing Sheets

(56) References Cited

U.S. PATENT DOCUMENTS

| | | | | |
|---|---|---|---|---|
| 4,730,815 | A | * | 3/1988 | von Estorff ........... B60G 11/113 267/52 |
| 4,802,659 | A | * | 2/1989 | Hope ....................... F16F 1/368 280/124.17 |
| 5,244,300 | A | * | 9/1993 | Perreira ................ E04B 1/2403 403/333 |
| 2006/0165482 | A1 | * | 7/2006 | Olberding ................. E04B 1/24 403/381 |
| 2022/0412420 | A1 | * | 12/2022 | Eguchi .................... F16F 3/023 |

FOREIGN PATENT DOCUMENTS

| | | |
|---|---|---|
| CN | 203322123 U | 12/2013 |
| CN | 203962811 U | 11/2014 |
| CN | 104728321 A | 6/2015 |
| CN | 204493543 U | 7/2015 |
| CN | 205689654 U | 11/2016 |
| CN | 206036089 U | 3/2017 |
| CN | 206918140 U | 1/2018 |
| CN | 109383209 A | 2/2019 |
| DE | 370599 C | 3/1923 |
| DE | 446362 C | 6/1927 |
| GB | 190900997 A | 1/1909 |
| JP | 48013132 B1 | 4/1973 |
| JP | 59023877 Y2 | 7/1984 |
| JP | 62037639 U | 3/1987 |
| JP | 63160449 U | 10/1988 |
| KR | 20020050610 A | 6/2002 |
| NL | 23881 C | 10/1930 |
| RU | 2055245 C1 | 2/1996 |
| RU | 2091629 C1 | 9/1997 |
| SU | 01567813 A1 | 5/1990 |

OTHER PUBLICATIONS

EPO Extended European Search Report for Corresponding EP Application No. 20891567.8; dated Jan. 3, 2023.
CNIPA First Office Action for corresponding CN202080081485.5; dated Apr. 26, 2023.
SIPO Notice of Allowance and Search Report for corresponding CN Application No. 202080081485.5; dated Jan. 4, 2024; 6 pages; partial English translation.

* cited by examiner

LEAF SPRING DEVICE

CROSS REFERENCE TO RELATED APPLICATIONS

This is the U.S. national stage of application No. PCT/JP2020/044143, filed on Nov. 27, 2020. Priority under 35 U.S.C. § 119(a) and 35 U.S.C. § 365(b) is claimed from Japanese Application No. 2019-214204, filed Nov. 27, 2019, the disclosure of which is also incorporated herein by reference.

The present invention relates to a leaf spring device.

BACKGROUND ART

Conventionally, a leaf spring device including a plurality of leaf springs provided to be stacked in a vertical direction is known. As a leaf spring device of this type, a configuration in which holding plates extending in a vertical direction are provided at both end portions in a plate width direction of one leaf spring of a plurality of leaf springs, and remaining leaf springs are sandwiched in the plate width direction by the holding plates is known. With this configuration, leaf springs adjacent to each other in the vertical direction are prevented from rotating relative to each other around a central axis extending in the vertical direction and passing through central portions of the plurality of leaf springs.

CITATION LIST

Patent Document

Patent Document 1

Japanese Examined Utility Model Application, Second Publication No. S59-23877

SUMMARY OF INVENTION

Technical Problem

In the conventional leaf spring device, since the holding plates protrude with respect to the leaf springs, there is a possibility of causing space constraints. When the leaf springs adjacent to each other in the vertical direction rotate relative to each other around the central axis, there is a possibility that the leaf springs on which the holding plates are not formed may, for example, come into line contact with the holding plates, and thus there may be difficulty in securing durability.

The present invention has been made in view of the above circumstances, and an object thereof is to provide a leaf spring device in which leaf springs adjacent to each other in a vertical direction can be inhibited from rotating relative to each other around a central axis while inhibiting bulkiness and securing durability.

Solution to Problem

A leaf spring device of one aspect of the present invention includes a plurality of leaf springs provided to be stacked in a vertical direction, in which a restricting protrusion is provided on a surface of one of two leaf springs adjacent to each other in the vertical direction, a recessed part is formed on a surface of the other thereof, and the restricting protrusion is inserted into the recessed part, a longitudinal direction of each of the restricting protrusion and the recessed part coincides with a longitudinal direction of the leaf springs when viewed from the vertical direction, central portions of the leaf springs, the restricting protrusion, and the recessed part coincide with each other when viewed from the vertical direction, the restricting protrusion includes a first side surface and a second side surface facing a plate width direction perpendicular to the vertical direction and the longitudinal direction, extending in the longitudinal direction, and positioned on both sides sandwiching the central portions of the leaf springs, the restricting protrusion, and the recessed part in the plate width direction when viewed from the vertical direction, the recessed part includes a third side surface and a fourth side surface facing the plate width direction, extending in the longitudinal direction, and facing each other with the restricting protrusion sandwiched therebetween in the plate width direction, the first side surface and the third side surface face each other in the plate width direction, the second side surface and the fourth side surface face each other in the plate width direction, a first inclined surface is formed on one side surface of the first side surface and the third side surface to become further away from the other side surface thereof in the plate width direction from the central portion toward a first direction in the longitudinal direction, and a second inclined surface is formed on one side surface of the second side surface and the fourth side surface to become further away from the other side surface thereof in the plate width direction from the central portion toward a second direction opposite to the first direction in the longitudinal direction.

According to the present invention, on the surface of one of two leaf springs adjacent to each other in the vertical direction, the restricting protrusion inserted into the recessed part formed on the surface of the other thereof is provided. Therefore, when the leaf springs adjacent to each other in the vertical direction rotate relative to each other around the central axis passing through central portions of the leaf springs, the restricting protrusion, and the recessed part when viewed from the vertical direction and extending in the vertical direction, the first side surface of the restricting protrusion and the third side surface of the recessed part come into contact with each other, the second side surface of the restricting protrusion and the fourth side surface of the recessed part come into contact with each other, and thereby the relative rotation can be restricted.

At this time, the first inclined surface is formed on one side surface of the first side surface and the third side surface to be further away from the other side surface thereof in the plate width direction from the central portion toward the first direction in the longitudinal direction, and the second inclined surface is formed on one side surface of the second side surface and the fourth side surface to be further away from the other side surface thereof in the plate width direction from the central portion toward the second direction opposite to the first direction in the longitudinal direction. Therefore, when the leaf springs adjacent to each other in the vertical direction rotate relative to each other around the central axis, the first side surface of the restricting protrusion and the third side surface of the recessed part come into surface contact with each other by the first inclined surface, and the second side surface of the restricting protrusion and the fourth side surface of the recessed part come into surface contact with each other by the second inclined surface. Thereby, occurrence of a portion in which stress is concentrated on the first to fourth side surfaces can be suppressed, and the durability can be secured.

When viewed from the vertical direction, the longitudinal direction of each of the restricting protrusion and the recessed part coincides with the longitudinal direction of the leaf springs. Therefore, it can be made more difficult for the restricting protrusion to come off from the recessed part when a load is applied to the leaf spring device and the plurality of leaf springs are bent and deformed in the vertical direction, compared to a configuration in which a longitudinal direction of each of the restricting protrusion and the recessed part extends in a plate width direction of the leaf springs.

The restricting protrusion and the recessed part are provided between the two leaf springs adjacent to each other in the vertical direction. Therefore, the above-described operation and effects can be achieved without having a protruding portion with respect to the plurality of leaf springs, and the leaf spring device can be prevented from being bulky.

An inclination angle of the first inclined surface with respect to the longitudinal direction and an inclination angle of the second inclined surface with respect to the longitudinal direction when viewed from the vertical direction may be the same as each other.

In this case, the inclination angle of the first inclined surface with respect to the longitudinal direction and the inclination angle of the second inclined surface with respect to the longitudinal direction when viewed from the vertical direction are the same as each other. Therefore, when the leaf springs adjacent to each other in the vertical direction rotate relative to each other around the central axis, the first side surface of the restricting protrusion and the third side surface of the recessed part come into contact with each other, and the second side surface of the restricting protrusion and the fourth side surface of the recessed part come into contact with each other, occurrence of a portion in which stress is concentrated on the first to fourth side surfaces can be reliably suppressed.

A third inclined surface may be formed on one side surface of the first side surface and the third side surface to be further away from the other side surface thereof in the plate width direction from the central portion toward the second direction in the longitudinal direction, and a fourth inclined surface may be formed on one side surface of the second side surface and the fourth side surface to be further away from the other side surface thereof in the plate width direction from the central portion toward the first direction in the longitudinal direction.

In this case, the first to fourth inclined surfaces are provided. Therefore, the first side surface of the restricting protrusion and the third side surface of the recessed part can be brought into surface contact with each other and the second side surface of the restricting protrusion and the fourth side surface of the recessed part can be brought into surface contact with each other regardless of a rotation direction of the leaf springs adjacent to each other in the vertical direction around the central axis. Thereby, occurrence of a portion in which stress is concentrated on the first to fourth side surfaces can be reliably suppressed.

An inclination angle of the third inclined surface with respect to the longitudinal direction and an inclination angle of the fourth inclined surface with respect to the longitudinal direction when viewed from the vertical direction may be the same as each other.

In this case, the inclination angle of the third inclined surface with respect to the longitudinal direction and the inclination angle of the fourth inclined surface with respect to the longitudinal direction when viewed from the vertical direction are the same as each other. Therefore, when the leaf springs adjacent to each other in the vertical direction rotate relative to each other around the central axis, the first side surface of the restricting protrusion and the third side surface of the recessed part come into contact with each other, and the second side surface of the restricting protrusion and the fourth side surface of the recessed part come into contact with each other, occurrence of a portion in which stress is concentrated on the first to fourth side surfaces can be reliably suppressed.

The inclination angle of the first inclined surface with respect to the longitudinal direction, the inclination angle of the second inclined surface with respect to the longitudinal direction, the inclination angle of the third inclined surface with respect to the longitudinal direction, and the inclination angle of the fourth inclined surface with respect to the longitudinal direction when viewed from the vertical direction may be the same as each other.

In this case, the inclination angles of the first to fourth inclined surfaces with respect to the longitudinal direction when viewed from the vertical direction are the same as each other. Therefore, loads applied to the first to fourth side surfaces can be made equal to each other regardless of the rotation direction of the leaf springs adjacent to each other in the vertical direction around the central axis, and the durability can be reliably secured.

A width of the restricting protrusion in the plate width direction may become smaller with distance away from the surface of the leaf spring, on which the restricting protrusion is formed, in the vertical direction, and a width of the recessed part in the plate width direction may become smaller with distance away from the surface of the leaf spring, on which the recessed part is formed, in the vertical direction.

In this case, the width of the restricting protrusion in the plate width direction becomes smaller with distance away from the surface of the leaf spring, on which the restricting protrusion is formed, in the vertical direction, and the width of the recessed part in the plate width direction becomes smaller with distance away from the surface of the leaf spring, on which the recessed part is formed, in the vertical direction. Therefore, large planar areas for each of the first to fourth side surfaces can be secured compared to a configuration in which widths of the restricting protrusion and the recessed part are the same over the entire region in the vertical direction, and when the first side surface of the restricting protrusion and the third side surface of the recessed part come into surface contact with each other, and the second side surface of the restricting protrusion and the fourth side surface of the recessed part come into surface contact with each other, occurrence of a portion in which stress is concentrated on the first to fourth side surfaces can be reliably suppressed.

Advantageous Effects of Invention

According to the present invention, leaf springs adjacent to each other in a vertical direction can be inhibited from rotating relative to each other around a central axis while inhibiting bulkiness and securing durability.

DESCRIPTION OF EMBODIMENTS

First Embodiment

Figure 1:
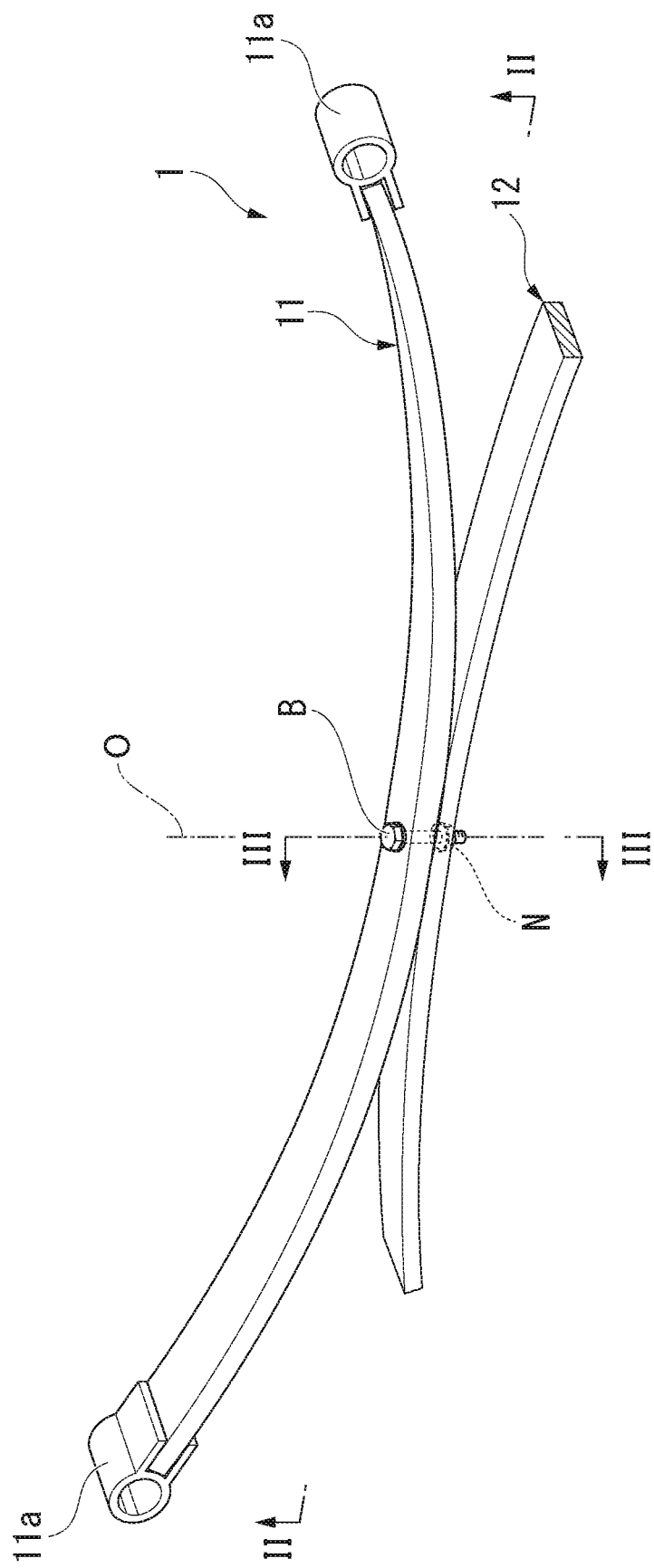
FIG. 1 is a perspective view of a leaf spring device illustrated as a first embodiment according to the present invention.

Hereinafter, a first embodiment of a leaf spring device according to the present invention will be described with reference to FIGS. 1 to 3.

A leaf spring device 1 of the present embodiment includes a plurality of leaf springs 11 and 12 provided to be stacked in a vertical direction.

The leaf springs 11 and 12 are formed of, for example, a resin, a metal, a fiber reinforced resin (FRP), or the like. As fibers contained in a fiber reinforced resin, glass fibers, carbon fibers, and the like can be exemplified. In the illustrated example, the leaf springs 11 and 12 are formed of a fiber reinforced resin containing short glass fibers. The fibers are contained in the resin in a state of extending in a longitudinal direction of the leaf springs 11 and 12.

Of the plurality of leaf springs 11 and 12, the main leaf spring 11 positioned on an upper side extends upward from a central portion toward end portions in the longitudinal direction and is curved in a curved surface shape that is convex downward. Of the plurality of leaf springs 11 and 12, the auxiliary leaf spring 12 positioned on a lower side extends downward from a central portion toward end portions in the longitudinal direction and is curved in a curved surface shape that is convex upward. The central portions of the main leaf spring 11 and the auxiliary leaf spring 12 in the longitudinal direction are in contact with each other and are stacked in the vertical direction.

The central portions of the plurality of leaf springs 11 and 12 as viewed from the vertical direction are identical to each other. When a bolt B penetrating the central portions of the plurality of leaf springs 11 and 12 in the vertical direction is provided and a nut N is screwed to the bolt B, the plurality of leaf springs 11 and 12 are integrally fixed.

Hereinafter, a straight line extending in the vertical direction and passing through the central portions of the plurality of leaf springs 11 and 12 is referred to as a central axis O.

Mounting cylindrical parts 11a that open in a plate width direction perpendicular to the vertical direction and the longitudinal direction are provided at both end portions of the main leaf spring 11 in the longitudinal direction. The leaf spring device 1 is connected to a vehicle body or the like via the mounting cylindrical parts 11a.

One main leaf spring 11 and one auxiliary leaf spring 12 are provided in the illustrated example, but for example, a plurality of main leaf spring 11 and a plurality of auxiliary leaf spring 12 may be provided.

Figure 2:
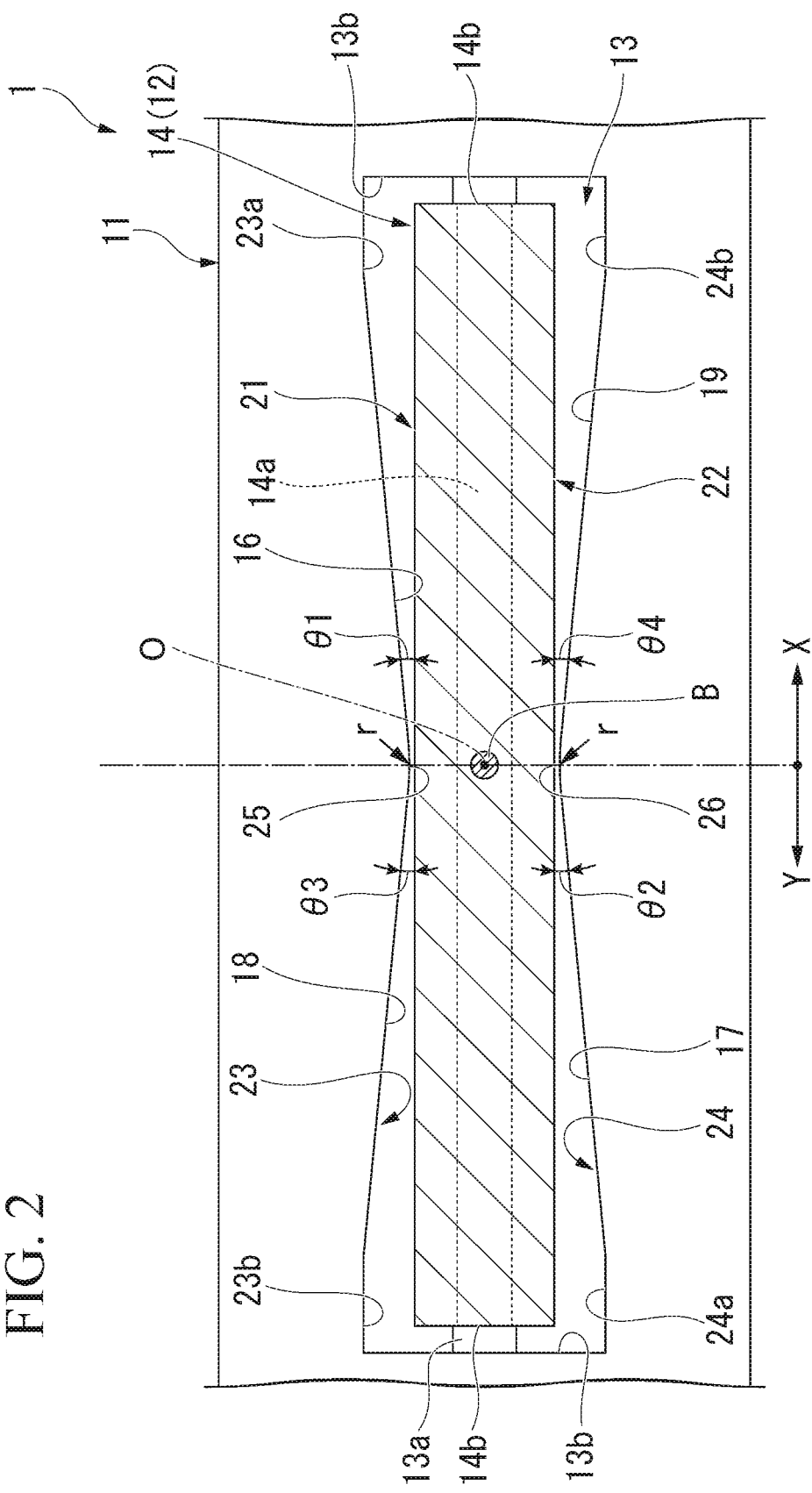
FIG. 2 is a cross-sectional view along the arrow II-II of the leaf spring device illustrated in FIG. 1.
Figure 3:
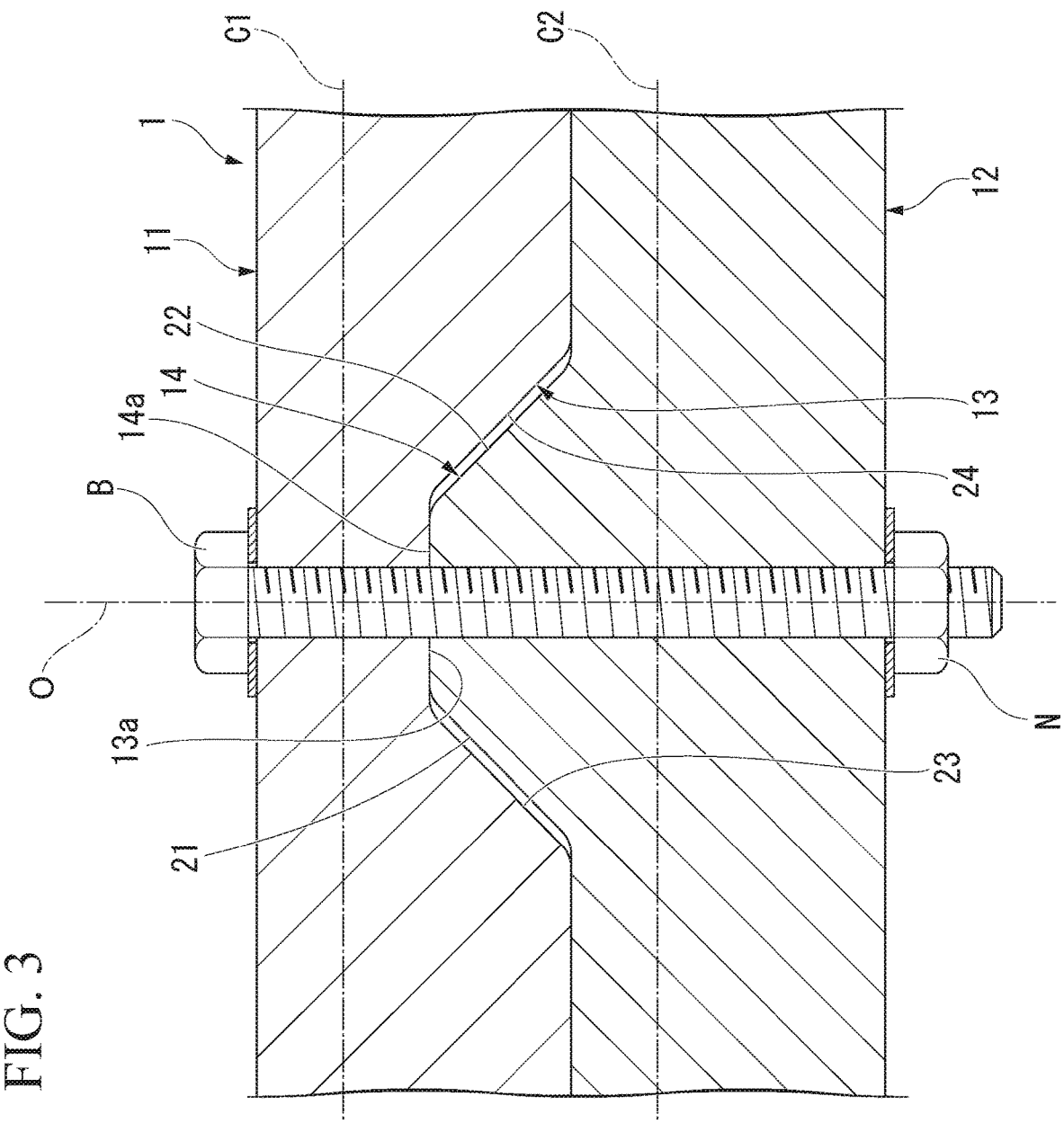
FIG. 3 is a cross-sectional view along the arrow III-III of the leaf spring device illustrated in FIG. 1.

In the present embodiment, as illustrated in FIGS. 2 and 3, a restricting protrusion 14 is provided on a surface of one leaf spring 12 of the two leaf springs 11 and 12 adjacent to each other in the vertical direction, and a recessed part 13 into which the restricting protrusion 14 is inserted is formed on a surface of the other leaf spring 11.

The restricting protrusion 14 and the recessed part 13 are provided at the central portions of the leaf springs 11 and 12 in the longitudinal direction. When viewed from the vertical direction, the recessed part 13 is larger than the restricting protrusion 14. The restricting protrusion 14 and the recessed part 13 may be provided over the entire length of the leaf springs 11 and 12 in the longitudinal direction.

In the illustrated example, the recessed part 13 is formed on a lower surface of the main leaf spring 11, and the restricting protrusion 14 is formed on an upper surface of the auxiliary leaf spring 12.

The recessed part 13 may be formed on the upper surface of the auxiliary leaf spring 12, and the restricting protrusion 14 may be provided on the lower surface of the main leaf spring 11. The restricting protrusion 14 may be formed of the same material as a material forming the auxiliary leaf spring 12, or may be formed of a different material. The restricting protrusion 14 may be a separate body from the auxiliary leaf spring 12. When the restricting protrusion 14 is provided separately from the auxiliary leaf spring 12, the restricting protrusion 14 and the auxiliary leaf spring 12 may be fixed by adhesion or fitting. When the restricting protrusion 14 is formed of a material different from that of the auxiliary leaf spring 12, for example, a resin, a metal, or a fiber reinforced resin (FRP) may be exemplified as the material of the restricting protrusion 14. Similarly, the recessed part 13 may be a separate body from the main leaf spring 11. When the recessed part 13 is provided separately from the main plate spring 11, the recessed part 13 and the main leaf spring 11 may be fixed by adhesion or fitting. When the recessed part 13 is formed of a material different from that of the main leaf spring 11, for example, a resin, a metal, or a fiber reinforced resin (FRP) may be exemplified as the material of the recessed part 13.

When viewed from the vertical direction, a longitudinal direction of each of the restricting protrusion 14 and the recessed part 13 coincides with the longitudinal direction of the leaf springs 11 and 12. In the illustrated example, the restricting protrusion 14 and the recessed part 13 each have a rectangular shape when viewed from the vertical direction. Central portions of the restricting protrusion 14 and the recessed part 13 when viewed from the vertical direction coincide with the central portions of the plurality of leaf springs 11 and 12.

Both end edges of each of the restricting protrusion 14 and the recessed part 13 in the longitudinal direction may have, for example, a curved shape that is convex toward the outside in the longitudinal direction when viewed from the vertical direction. Widths in the plate width direction of both end portions of each of the restricting protrusion 14 and the recessed part 13 in the longitudinal direction may become smaller toward the outside in the longitudinal direction.

The restricting protrusion 14 includes a first side surface 21 and a second side surface 22 facing the plate width direction and extending in the longitudinal direction. The first side surface 21 and the second side surface 22 are positioned on both sides of the central axis O in the plate width direction when viewed from the vertical direction.

In the illustrated example, the restricting protrusion 14 is formed in a rectangular parallelepiped shape, and has upper end surface 14a connecting upper end portions of the first side surface 21 and the second side surface 22 and facing upward. Both end surfaces 14b in the longitudinal direction of the restricting protrusion 14 extend straight in the vertical direction.

The restricting protrusion 14 may not have the upper end surface 14a, and the both end surfaces 14b in the longitudinal direction of the restricting protrusion 14 may, for example, extend inward in the longitudinal direction from the upper surface of the auxiliary leaf spring 12 upward to shorten a length of the restricting protrusion 14. The restricting protrusion 14 is not limited to a rectangular parallelepiped shape and may be appropriately changed.

The recessed part 13 includes a third side surface 23 and a fourth side surface 24 facing the plate width direction and extending in the longitudinal direction. The third side surface 23 and the fourth side surface 24 face each other with the restricting protrusion 14 sandwiched therebetween in the plate width direction.

In the illustrated example, an internal space of the recessed part 13 is formed in a rectangular parallelepiped shape, and the recessed part 13 has an upper end surface 13a connecting upper end portions of the third side surface 23 and the fourth side surface 24 and facing downward. Both end surfaces 13b in the longitudinal direction of the recessed part 13 extend straight in the vertical direction.

The recessed part 13 may not have the upper end surface 13a, and the both end surfaces 13b in the longitudinal direction of the recessed part 13 may, for example, extend inward in the longitudinal direction from the lower surface of the main leaf spring 11 upward to shorten a length of the recessed part 13.

The first side surface 21 of the restricting protrusion 14 and the third side surface 23 of the recessed part 13 face each other in the plate width direction, and the second side surface 22 of the restricting protrusion 14 and the fourth side surface 24 of the recessed part 13 face each other in the plate width direction.

Central portions of the first side surface 21 and the third side surface 23 in the longitudinal direction are in contact with or close to each other in the plate width direction. Central portions of the second side surface 22 and the fourth side surface 24 in the longitudinal direction are in contact with or close to each other in the plate width direction. The upper end surface 14a of the restricting protrusion 14 is in contact with or close to the upper end surface 13a of the recessed part 13.

In the present embodiment, as illustrated in FIG. 3, the central portions of the first side surface 21 and the third side surface 23 in the longitudinal direction are close to each other in the plate width direction. The central portions of the second side surface 22 and the fourth side surface 24 in the longitudinal direction are close to each other in the plate width direction. The upper end surfaces 14a and 13a of the restricting protrusion 14 and the recessed part 13 are in contact with each other.

In the example of FIG. 3, the first side surface 21 and the third side surface 23 have planes close to each other, but may have curved surfaces close to each other. The second side surface 22 and the fourth side surface 24 have planes close to each other, but may have curved surfaces close to each other.

A width of the restricting protrusion 14 in the plate width direction becomes smaller with distance away from the upper surface of the auxiliary leaf spring 12, on which the restricting protrusion 14 is formed, upward. That is, the first side surface 21 and the second side surface 22 extend inward in the plate width direction to come close to each other from the upper surface of the auxiliary leaf spring 12 upward.

A width of the recessed part 13 in the plate width direction becomes smaller with distance away from the lower surface of the main leaf spring 11, on which the recessed part 13 is formed, upward. That is, the third side surface 23 and the fourth side surface 24 extend inward in the plate width direction to come close to each other from the lower surface of the main leaf spring 11 upward.

A first inclined surface 16 is formed on one side surface of the first side surface 21 and the third side surface 23 to be further away from the other side surface thereof in the plate width direction from the central portion toward a first direction X in the longitudinal direction.

In the illustrated example, the first inclined surface 16 is provided over the entire region of the third side surface 23 of the recessed part 13 between the central portion in the longitudinal direction and an end portion 23a in the first direction X. The end portion 23a of the third side surface 23 in the first direction X extends straight in the longitudinal direction.

A second inclined surface 17 is formed on one side surface of the second side surface 22 and the fourth side surface 24 to be further away from the other side surface thereof in the plate width direction from the central portion toward a second direction Y opposite to the first direction X in the longitudinal direction.

In the illustrated example, the second inclined surface 17 is provided over the entire region of the fourth side surface 24 of the recessed part 13 between the central portion in the longitudinal direction and an end portion 24a in the second direction Y. The end portion 24a of the fourth side surface 24 in the second direction Y extends straight in the longitudinal direction.

When viewed from the vertical direction, an inclination angle θ1 of the first inclined surface 16 with respect to the longitudinal direction and an inclination angle θ2 of the second inclined surface 17 with respect to the longitudinal direction are the same as each other. Thereby, when the leaf springs 11 and 12 adjacent to each other in the vertical direction rotate relative to each other around the central axis O, surface contact between the first side surface 21 of the restricting protrusion 14 and the first inclined surface 16 and surface contact between the second side surface 22 of the restricting protrusion 14 and the second inclined surface 17 occur at the same time. Further, the inclination angles θ1 and θ2 may be made different from each other.

A third inclined surface 18 is formed on one side surface of the first side surface 21 and the third side surface 23 to be further away from the other side surface thereof in the plate width direction from the central portion toward the second direction Y in the longitudinal direction.

In the illustrated example, the third inclined surface 18 is provided over the entire region of the third side surface 23 of the recessed part 13 between the central portion in the longitudinal direction and an end portion 23b in the second direction Y. The end portion 23b of the third side surface 23 in the second direction Y extends straight in the longitudinal direction.

A fourth inclined surface 19 is formed on one side surface of the second side surface 22 and the fourth side surface 24 to be further away from the other side surface thereof in the plate width direction from the central portion toward the first direction X in the longitudinal direction.

In the illustrated example, the fourth inclined surface 19 is provided over the entire region of the fourth side surface 24 of the recessed part 13 between the central portion in the longitudinal direction and an end portion 24b in the first direction X. The end portion 24b of the fourth side surface 24 in the first direction X extends straight in the longitudinal direction.

When viewed from the vertical direction, an inclination angle θ3 of the third inclined surface 18 with respect to the longitudinal direction and an inclination angle θ4 of the fourth inclined surface 19 with respect to the longitudinal direction are the same as each other. Thereby, when the leaf springs 11 and 12 adjacent to each other in the vertical direction rotate relative to each other around the central axis O, surface contact between the first side surface 21 of the restricting protrusion 14 and the third inclined surface 18 and surface contact between the second side surface 22 of the restricting protrusion 14 and the fourth inclined surface 19 occur at the same time. The inclination angles θ3 and θ4 may be made different from each other.

In the present embodiment, when viewed from the vertical direction, the inclination angle θ1 of the first inclined surface 16 with respect to the longitudinal direction, the inclination angle θ2 of the second inclined surface 17 with respect to the longitudinal direction, the inclination angle θ3 of the third inclined surface 18 with respect to the longitudinal direction, and the inclination angle θ4 of the fourth inclined surface 19 with respect to the longitudinal direction are the same as each other.

When viewed from the vertical direction, the inclination angles θ1 and θ2 of the first inclined surface 16 and the second inclined surface 17 with respect to the longitudinal direction, and the inclination angles θ3 and θ4 of the third inclined surface 18 and the fourth inclined surface 19 with respect to the longitudinal direction may be made different from each other.

The first side surface 21 and the second side surface 22 of the restricting protrusion 14 extend straight in the longitudinal direction over the entire region.

The third side surface 23 and the fourth side surface 24 of the recessed part 13 become further away from each other from the central portion toward the end portions 23a, 23b, 24a, and 24b in the longitudinal direction so that the width of the recessed part 13 increases.

A connecting portion 25 for connecting the first inclined surface 16 and the third inclined surface 18 without any step is provided at the central portion in the longitudinal direction of the third side surface 23 of the recessed part 13. The connecting portion 25 is formed in a curved surface shape that is convex toward the inside in the plate width direction. A connecting portion 26 for connecting the second inclined surface 17 and the fourth inclined surface 19 without any step is provided at the central portion in the longitudinal direction of the fourth side surface 24 of the recessed part 13. The connecting portion 26 is formed in a curved surface shape that is convex toward the inside in the plate width direction.

In the illustrated example, when viewed from the vertical direction, radii of curvature r of the connecting portions 25 and 26 are the same as each other, but may be made different from each other.

When viewed from the vertical direction, the first inclined surface 16, the third inclined surface 18, and the connecting portion 25 as a whole may have a single arc shape or an arc shape with inflection. The second inclined surface 17, the fourth inclined surface 19, and the connecting portion 26 may have a single arc shape or an arc shape with inflection.

As described above, according to the leaf spring device 1 according to the present embodiment, the restricting protrusion 14 is provided on the surface of one leaf spring 12 of the two leaf springs 11 and 12 adjacent to each other in the vertical direction, the recessed part 13 is formed on the surface of the other leaf spring 11 thereof, and the restricting protrusion 14 is inserted into the recessed part 13.

Therefore, when the leaf springs 11 and 12 adjacent to each other in the vertical direction rotate relative to each other around the central axis O, the first side surface 21 of the restricting protrusion 14 and the third side surface 23 of the recessed part 13 come into contact with each other, and the second side surface 22 of the restricting protrusion 14 and the fourth side surface 24 of the recessed part 13 come into contact with each other. Thereby, relative rotation of the leaf springs 11 and 12 can be restricted.

Also, a bending rigidity of a portion of the leaf springs 11 and 12 in which the recessed part 13 and the restricting protrusion 14 are provided can be improved compared to a conventional leaf spring device in which the recessed part 13 and the restricting protrusion 14 are not provided.

Also, in the conventional leaf spring device in which the recessed part 13 and the restricting protrusion 14 are not provided, a neutral axis of each leaf spring of the leaf spring device is positioned at a center of the leaf spring in the vertical direction. In the present embodiment, when the recessed part 13 and the restricting protrusion 14 are provided, positions of neutral axes C1 and C2 of the leaf springs 11 and 12 can be moved as illustrated in FIG. 3, and thereby a stress ratio of tension and compression generated when the leaf spring device 1 functions in the vertical direction can be changed. That is, the stress can be optimized by forming the recessed part 13 and the restricting protrusion 14, and the durability of the leaf spring device 1 in the vertical direction can be improved.

At this time, the first inclined surface 16 is formed on one side surface of the first side surface 21 and the third side surface 23 to be further away from the other side surface thereof in the plate width direction from the central portion toward the first direction X in the longitudinal direction. The second inclined surface 17 is formed on one side surface of the second side surface 22 and the fourth side surface 24 to be further away from the other side surface thereof in the plate width direction from the central portion toward the second direction Y opposite to the first direction X in the longitudinal direction.

Therefore, when the leaf springs 11 and 12 adjacent to each other in the vertical direction rotate relative to each other around the central axis O, the first side surface 21 of the restricting protrusion 14 and the third side surface 23 of the recessed part 13 come into surface contact with each other by the first inclined surface 16, and the second side surface 22 of the restricting protrusion 14 and the fourth side surface 24 of the recessed part 13 come into surface contact with each other by the second inclined surface 17. Thereby, occurrence of a portion in which stress is concentrated on the first to fourth side surfaces 21 to 24 can be suppressed, and the durability can be secured.

Also, the first inclined surface 16 is formed on one side surface of the first side surface 21 and the third side surface 23 to be further away from the other side surface thereof in the plate width direction from the central portion toward the first direction X in the longitudinal direction. The second inclined surface 17 is formed on one side surface of the second side surface 22 and the fourth side surface 24 to be further away from the other side surface thereof in the plate width direction from the central portion toward the second direction Y in the longitudinal direction. Therefore, except for a case in which the leaf springs 11 and 12 come into contact with each other when they rotate relative to each other, the first side surface 21 and the third side surface 23 are not in contact with each other at least in a portion other than the central portion in the longitudinal direction, and the second side surface 22 and the fourth side surface 24 are not in contact with each other at least in a portion other than the central portion in the longitudinal direction. Therefore, generation of friction due to contact between the leaf springs 11 and 12 can be reduced, and the durability of the leaf spring device 1 is improved.

When viewed from the vertical direction, the longitudinal direction of each of the restricting protrusion 14 and the recessed part 13 coincides with the longitudinal direction of the leaf springs 11 and 12. Therefore, it can be made more difficult for the restricting protrusion 14 to come off from the recessed part 13 when a load is applied to the leaf spring device 1 and the plurality of leaf springs 11 and 12 are bent and deformed in the vertical direction, compared to a configuration in which longitudinal directions of the restricting protrusion 14 and the recessed part 13 extend in the plate width direction of the leaf springs 11 and 12.

The restricting protrusion 14 and the recessed part 13 are provided between the two leaf springs 11 and 12 adjacent to each other in the vertical direction. Therefore, the above-described operation and effects can be achieved without having a protruding portion with respect to the plurality of leaf springs 11 and 12, and the leaf spring device 1 can be prevented from being bulky.

When viewed from the vertical direction, the inclination angle θ1 of the first inclined surface 16 with respect to the longitudinal direction and the inclination angle θ2 of the second inclined surface 17 with respect to the longitudinal direction are the same as each other. Therefore, when the leaf springs 11 and 12 adjacent to each other in the vertical direction rotate relative to each other around the central axis O, the first side surface 21 of the restricting protrusion 14 and the third side surface 23 of the recessed part 13 come into contact with each other, and the second side surface 22 of the restricting protrusion 14 and the fourth side surface 24 of the recessed part 13 come into contact with each other, occurrence of a portion in which stress is concentrated on the first to fourth side surfaces 21 to 24 can be reliably suppressed.

The first to fourth inclined surfaces 16 to 19 are provided. Therefore, the first side surface 21 of the restricting protrusion 14 and the third side surface 23 of the recessed part 13 can be brought into surface contact with each other and the second side surface 22 of the restricting protrusion 14 and the fourth side surface 24 of the recessed part 13 can be brought into surface contact with each other regardless of a rotation direction of the leaf springs 11 and 12 adjacent to each other in the vertical direction around the central axis O. Thereby, occurrence of a portion in which stress is concentrated on the first to fourth side surfaces 21 to 24 can be reliably suppressed.

When viewed from the vertical direction, the inclination angle θ3 of the third inclined surface 18 with respect to the longitudinal direction and the inclination angle θ4 of the fourth inclined surface 19 with respect to the longitudinal direction are the same as each other. Therefore, when the leaf springs 11 and 12 adjacent to each other in the vertical direction rotate relative to each other around the central axis O, the first side surface 21 of the restricting protrusion 14 and the third side surface 23 of the recessed part 13 come into contact with each other, and the second side surface 22 of the restricting protrusion 14 and the fourth side surface 24 of the recessed part 13 come into contact with each other, occurrence of a portion in which stress is concentrated on the first to fourth side surfaces 21 to 24 can be reliably suppressed.

When viewed from the vertical direction, the inclination angle θ1 of the first inclined surface 16 with respect to the longitudinal direction, the inclination angle θ2 of the second inclined surface 17 with respect to the longitudinal direction, the inclination angle θ3 of the third inclined surface 18 with respect to the longitudinal direction, and the inclination angle θ4 of the fourth inclined surface 19 with respect to the longitudinal direction are the same as each other. Therefore, loads applied to the first to fourth side surfaces 21 to 24 can be made equal to each other regardless of the rotation direction of the leaf springs 11 and 12 adjacent to each other in the vertical direction around the central axis O, and the durability can be reliably secured.

The width of the restricting protrusion 14 in the plate width direction becomes smaller with distance away from the upper surface of the auxiliary leaf spring 12, on which the restricting protrusion 14 is formed, upward, and the width of the recessed part 13 in the plate width direction becomes smaller with distance away from the lower surface of the main leaf spring 11, on which the recessed part 13 is formed, upward.

Therefore, large planar areas for each of the first to fourth side surfaces 21 to 24 can be secured compared to a configuration in which widths of the restricting protrusion 14 and the recessed part 13 are the same over the entire region in the vertical direction. Therefore, when the first side surface 21 of the restricting protrusion 14 and the third side surface 23 of the recessed part 13 come into surface contact with each other, and the second side surface 22 of the restricting protrusion 14 and the fourth side surface 24 of the recessed part 13 come into surface contact with each other, occurrence of a portion in which stress is concentrated on the first to fourth side surfaces 21 to 24 can be reliably suppressed.

Second Embodiment

Figure 4:
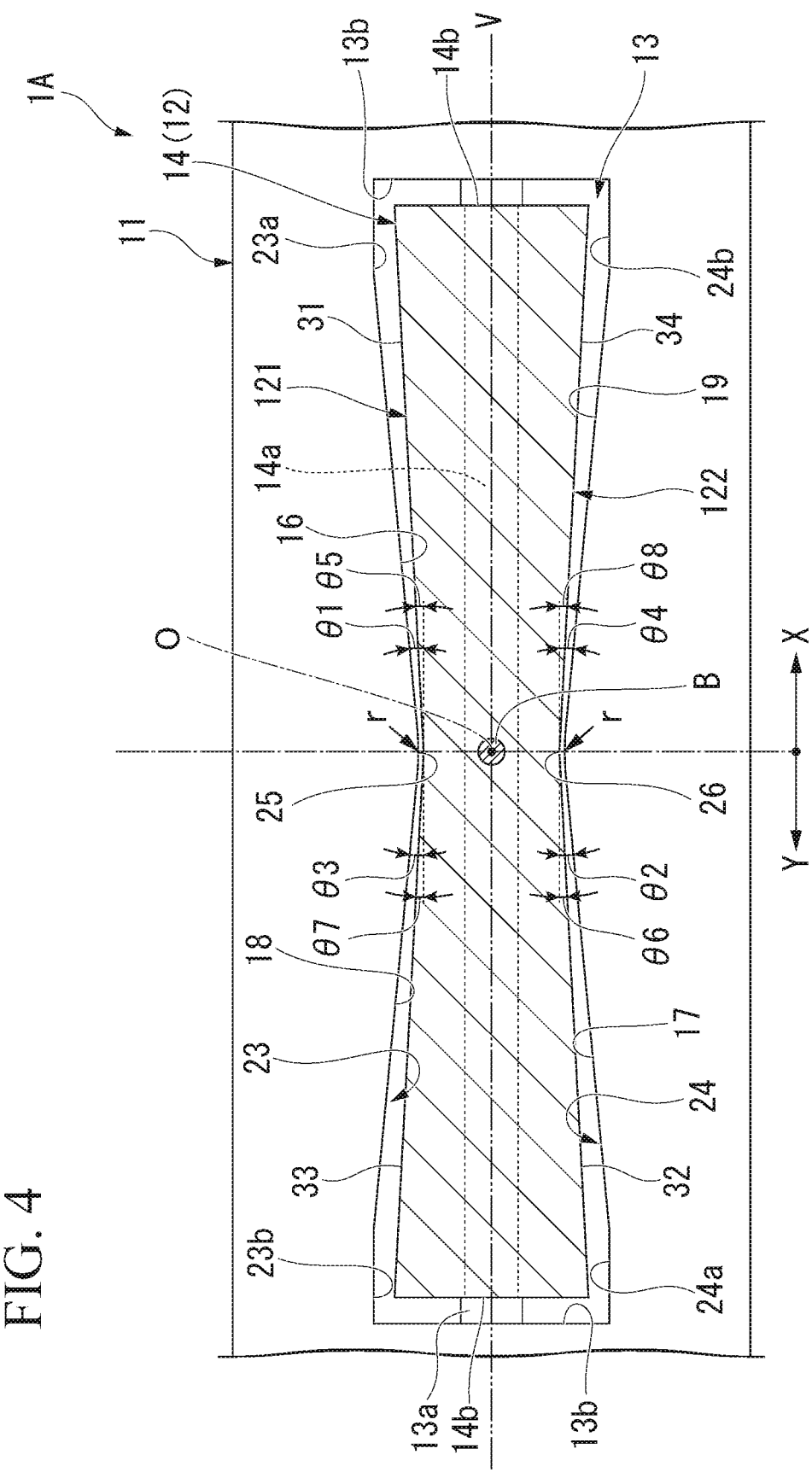
FIG. 4 is a cross-sectional view of a leaf spring device of a second embodiment according to the present invention.

Next, a second embodiment of a leaf spring device according to the present invention will be described with reference to FIG. 4. In the description of the present embodiment, components the same as those in the above-described first embodiment will be denoted by the same reference signs, description thereof will be omitted, and only different points will be described.

A leaf spring device 1A of the present embodiment is different from the leaf spring device 1 of the first embodiment in a configuration of the restricting protrusion 14. As illustrated in FIG. 4, in the present embodiment, a width of the restricting protrusion 14 in the plate width direction becomes larger from the central portion toward both end portions in the longitudinal direction when viewed from the vertical direction.

Specifically, a fifth inclined surface 31 is formed on a first side surface 121 of the restricting protrusion 14 to be further away from a virtual line V, which passes through the central axis O and extends in the longitudinal direction, in the plate width direction from the central portion toward the first direction X in the longitudinal direction.

The fifth inclined surface 31 faces the first inclined surface 16 formed on the third side surface 23 of the recessed part 13 in the plate width direction. When viewed from the vertical direction, the inclination angle θ1 of the first inclined surface 16 with respect to the longitudinal direction is larger than an inclination angle θ5 of the fifth inclined surface 31 with respect to the longitudinal direction. Therefore, the first inclined surface 16 is formed to be further away from the first side surface 121 (fifth inclined surface 31) in the plate width direction from the central portion toward the first direction X in the longitudinal direction. In other words, the fifth inclined surface 31 is formed to be further away from the third side surface 23 (first inclined surface 16) in the plate width direction from the central portion toward the first direction X in the longitudinal direction.

A sixth inclined surface 32 is formed on a second side surface 122 of the restricting protrusion 14 to be further away from the virtual line V in the plate width direction from the central portion toward the second direction Y in the longitudinal direction.

The sixth inclined surface 32 faces the second inclined surface 17 formed on the fourth side surface 24 of the recessed part 13 in the plate width direction. When viewed from the vertical direction, the inclination angle θ2 of the second inclined surface 17 with respect to the longitudinal direction is larger than an inclination angle θ6 of the sixth inclined surface 32 with respect to the longitudinal direction. Therefore, the second inclined surface 17 is formed to be further away from the second side surface 122 (sixth inclined surface 32) in the plate width direction from the central portion toward the second direction Y in the longitudinal direction. In other words, the sixth inclined surface 32 is formed to be further away from the fourth side surface 24 (second inclined surface 17) in the plate width direction from the central portion toward the second direction Y in the longitudinal direction.

A seventh inclined surface 33 is formed on the first side surface 121 of the restricting protrusion 14 to be further away from the virtual line V in the plate width direction from the central portion toward the second direction Y in the longitudinal direction.

The seventh inclined surface 33 faces the third inclined surface 18 formed on the third side surface 23 of the recessed part 13 in the plate width direction. When viewed from the vertical direction, the inclination angle θ3 of the third inclined surface 18 with respect to the longitudinal direction is larger than an inclination angle θ7 of the seventh inclined surface 33 with respect to the longitudinal direction. Therefore, the third inclined surface 18 is formed to be further away from the first side surface 121 (seventh inclined surface 33) in the plate width direction from the central portion toward the first direction X in the longitudinal direction. In other words, the seventh inclined surface 33 is formed to be further away from the third side surface 23 (third inclined surface 18) in the plate width direction from the central portion toward the first direction X in the longitudinal direction.

An eighth inclined surface 34 is formed on the second side surface 122 of the restricting protrusion 14 to be further away from the virtual line V in the plate width direction from the central portion toward the first direction X in the longitudinal direction.

The eighth inclined surface 34 faces the fourth inclined surface 19 formed on the fourth side surface 24 of the recessed part 13 in the plate width direction. When viewed from the vertical direction, the inclination angle θ4 of the fourth inclined surface 19 with respect to the longitudinal direction is larger than an inclination angle θ8 of the eighth inclined surface 34 with respect to the longitudinal direction. Therefore, the fourth inclined surface 19 is formed to be further away from the second side surface 122 (eighth inclined surface 34) in the plate width direction from the central portion toward the first direction X in the longitudinal direction. In other words, the eighth inclined surface 34 is formed to be further away from the fourth side surface 24 (fourth inclined surface 19) in the plate width direction from the central portion toward the first direction X in the longitudinal direction.

When viewed from the vertical direction, the inclination angle θ5 of the fifth inclined surface 31 with respect to the longitudinal direction, the inclination angle θ6 of the sixth inclined surface 32 with respect to the longitudinal direction, the inclination angle θ7 of the seventh inclined surface 33 with respect to the longitudinal direction, and the inclination angle θ8 of the eighth inclined surface 34 with respect to the longitudinal direction are the same as each other.

Also in the leaf spring device 1A of the present embodiment, the same operation and effects as the leaf spring device 1 of the first embodiment can be achieved.

Also, the fifth to eighth inclined surfaces 31 to 34 are provided on the restricting protrusion 14 in addition to the first to fourth inclined surfaces 16 to 19 provided on the recessed part 13. With this configuration, since a large contact area can be obtained and a direction in which a force is applied can be dispersed in the plate width direction and the longitudinal direction while maintaining the effect of restricting the relative rotation of the leaf springs 11 and 12, the durability of the leaf spring device 1A can be further improved.

Third Embodiment

Figure 5:
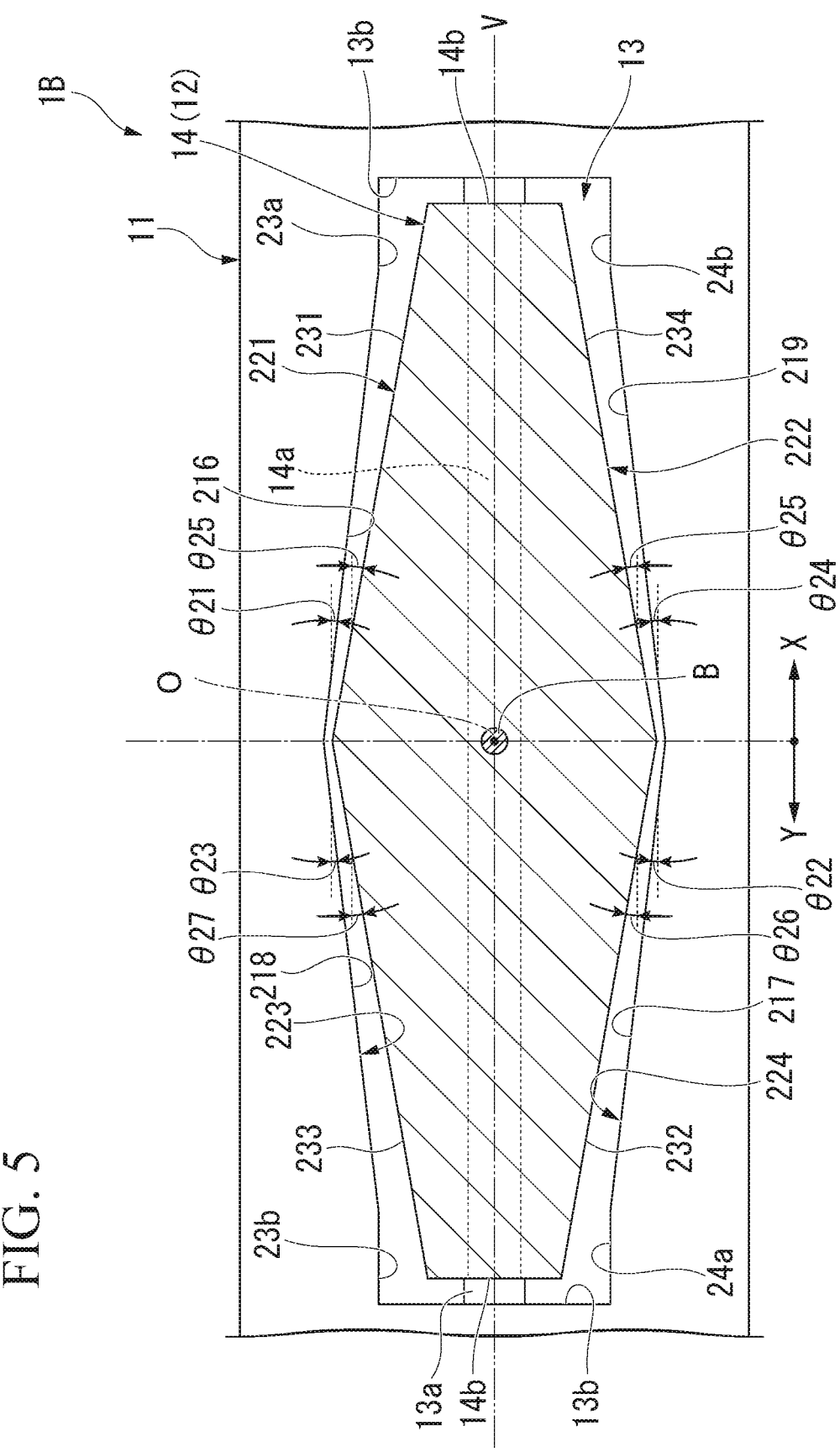
FIG. 5 is a cross-sectional view of a leaf spring device of a third embodiment according to the present invention.

Next, a third embodiment of a leaf spring device according to the present invention will be described with reference to FIG. 5. In the description of the present embodiment, components the same as those in the above-described first embodiment will be denoted by the same reference signs, description thereof will be omitted, and only different points will be described.

A leaf spring device 1B of the present embodiment is different from the leaf spring device 1 of the first embodiment in a configuration of the recessed part 13 and the restricting protrusion 14. As illustrated in FIG. 5, in the present embodiment, a width of the recessed part 13 in the plate width direction becomes smaller from the central portion to both end portions in the longitudinal direction when viewed from the vertical direction. Also, a width of the restricting protrusion 14 in the plate width direction becomes smaller from the central portion to both end portions in the longitudinal direction.

Specifically, a first inclined surface 216 is formed on a third side surface 223 of the recessed part 13 such that it approaches a virtual line V, which passes through the central axis O and extends in the longitudinal direction, in the plate width direction from the central portion toward the first direction X in the longitudinal direction.

A fifth inclined surface 231 is formed on a first side surface 221 of the restricting protrusion 14 to approach the virtual line V in the plate width direction from the central portion toward the first direction X in the longitudinal direction.

The fifth inclined surface 231 faces the first inclined surface 216 in the plate width direction. When viewed from the vertical direction, an inclination angle θ21 of the first inclined surface 216 with respect to the longitudinal direction is smaller than an inclination angle θ25 of the fifth inclined surface 231 with respect to the longitudinal direction. Therefore, the first inclined surface 216 is formed to be further away from the first side surface 221 (fifth inclined surface 231) in the plate width direction from the central portion toward the first direction X in the longitudinal direction. In other words, the fifth inclined surface 231 is formed to be further away from the third side surface 223 (first inclined surface 216) in the plate width direction from the central portion toward the first direction X in the longitudinal direction.

A second inclined surface 217 is formed on a fourth side surface 224 of the recessed part 13 to approach the virtual line V in the plate width direction from the central portion toward the second direction Y in the longitudinal direction.

A sixth inclined surface 232 is formed on a second side surface 222 of the restricting protrusion 14 to approach the virtual line V in the plate width direction from the central portion toward the second direction Y in the longitudinal direction.

The sixth inclined surface 232 faces the second inclined surface 217 in the plate width direction. When viewed from the vertical direction, an inclination angle θ22 of the second inclined surface 217 with respect to the longitudinal direction is smaller than an inclination angle θ26 of the sixth inclined surface 232 with respect to the longitudinal direction. Therefore, the second inclined surface 217 is formed to be further away from the second side surface 222 (sixth inclined surface 232) in the plate width direction from the central portion toward the second direction Y in the longitudinal direction. In other words, the sixth inclined surface 232 is formed to be further away from the fourth side surface 224 (second inclined surface 217) in the plate width direction from the central portion toward the second direction Y in the longitudinal direction.

A third inclined surface 218 is formed on the third side surface 223 of the recessed part 13 to approach the virtual line V in the plate width direction from the central portion toward the second direction Y in the longitudinal direction.

A seventh inclined surface 233 is formed on the first side surface 221 of the restricting protrusion 14 to approach the virtual line V in the plate width direction from the central portion toward the second direction Y in the longitudinal direction.

The seventh inclined surface 233 faces the third inclined surface 218 in the plate width direction. When viewed from the vertical direction, an inclination angle θ23 of the third inclined surface 218 with respect to the longitudinal direction is smaller than an inclination angle θ27 of the seventh inclined surface 233 with respect to the longitudinal direction. Therefore, the third inclined surface 218 is formed to be further away from the first side surface 221 (seventh inclined surface 233) in the plate width direction from the central portion toward the second direction Y in the longitudinal direction. In other words, the seventh inclined surface 233 is formed to be further away from the third side surface 223 (third inclined surface 218) in the plate width direction from the central portion toward the second direction Y in the longitudinal direction.

A fourth inclined surface 219 is formed on the fourth side surface 224 of the recessed part 13 to approach the virtual line V in the plate width direction from the central portion toward the first direction X in the longitudinal direction.

An eighth inclined surface 234 is formed on the second side surface 222 of the restricting protrusion 14 to approach the virtual line V in the plate width direction from the central portion toward the first direction X in the longitudinal direction.

The eighth inclined surface 234 faces the fourth inclined surface 219 in the plate width direction. When viewed from the vertical direction, an inclination angle θ24 of the fourth inclined surface 219 with respect to the longitudinal direction is smaller than an inclination angle θ28 of the eighth inclined surface 234 with respect to the longitudinal direction. Therefore, the fourth inclined surface 219 is formed to be further away from the second side surface 222 (eighth inclined surface 234) in the plate width direction from the central portion toward the first direction X in the longitudinal direction. In other words, the eighth inclined surface 234 is formed to be further away from the fourth side surface 224 (fourth inclined surface 219) in the plate width direction from the central portion toward the first direction X in the longitudinal direction.

When viewed from the vertical direction, the inclination angle θ21 of the first inclined surface 216 with respect to the longitudinal direction, the inclination angle θ22 of the second inclined surface 217 with respect to the longitudinal direction, the inclination angle θ23 of the third inclined surface 218 with respect to the longitudinal direction, and the inclination angle θ24 of the fourth inclined surface 219 with respect to the longitudinal direction are the same as each other.

Also, when viewed from the vertical direction, the inclination angle θ25 of the fifth inclined surface 231 with respect to the longitudinal direction, the inclination angle θ26 of the sixth inclined surface 232 with respect to the longitudinal direction, the inclination angle θ27 of the seventh inclined surface 233 with respect to the longitudinal direction, and the inclination angle θ28 of the eighth inclined surface 234 with respect to the longitudinal direction are the same as each other.

Also, in the leaf spring device 1B of the present embodiment, the same operation and effects as the leaf spring device 1 of the first embodiment can be achieved.

Also, the first to fourth inclined surfaces 216 to 219 are provided on the recessed part 13, and the fifth to eighth inclined surfaces 231 to 234 are provided on the restricting protrusion 14. With this configuration, since a large contact area can be obtained and a direction in which a force is applied can be dispersed in the plate width direction and the longitudinal direction while maintaining the effect of restricting the relative rotation of the leaf springs 11 and 12, the durability of the leaf spring device 1B can be further improved.

Fourth Embodiment

Figure 6:
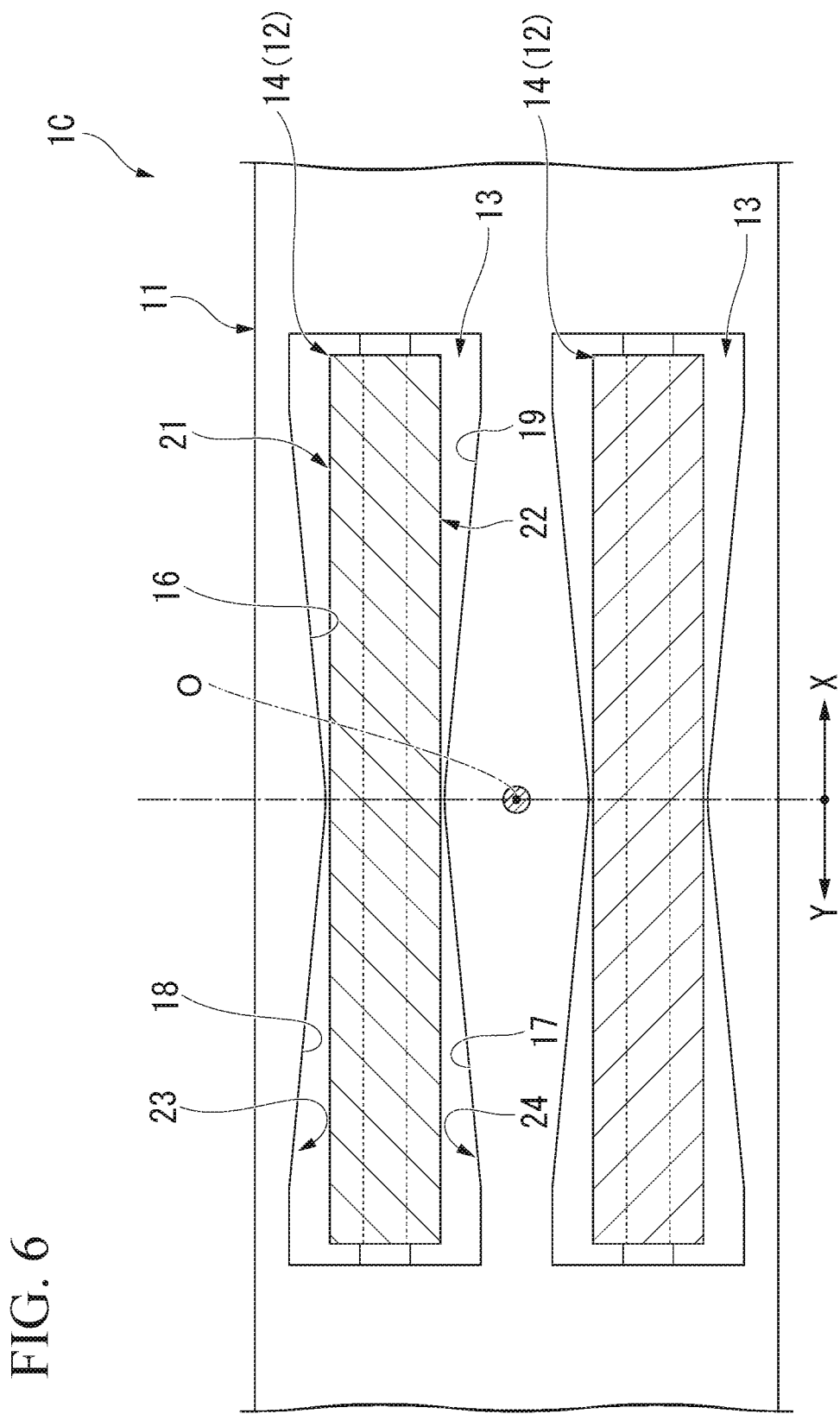
FIG. 6 is a cross-sectional view of a leaf spring device of a fourth embodiment according to the present invention.

Next, a fourth embodiment of a leaf spring device according to the present invention will be described with reference to FIG. 6. In the description of the present embodiment, components the same as those in the above-described first embodiment will be denoted by the same reference signs, description thereof will be omitted, and only different points will be described.

In a leaf spring device 1C of the present embodiment, two sets of the recessed part 13 and the restricting protrusion 14 are disposed in the plate width direction. Configurations of the recessed part 13 and the restricting protrusion 14 of the present embodiment are the same as those of the first embodiment. In the present embodiment, the recessed part 13 and the restricting protrusion 14 of the second or third embodiment may also be used.

When viewed from the vertical direction, the two sets of the recessed part 13 and the restricting protrusion 14 are disposed to sandwich the central axis O. When viewed from the vertical direction, the two sets of the recessed part 13 and the restricting protrusion 14 are provided to be point-symmetric with respect to the central axis O. Thereby, when the leaf springs 11 and 12 adjacent to each other in the vertical direction rotate relative to each other around the central axis O, contact between the first side surface 21 and the third side surface 23 and contact between the second side surface 22 and the fourth side surface 24 in one set of the recessed part 13 and the restricting protrusion 14, and contact between the first side surface 21 and the third side surface 23 and contact between the second side surface 22 and the fourth side surface 24 in the other set of the recessed part 13 and the restricting protrusion 14 occur at the same time.

Also, in the leaf spring device 1C of the present embodiment, the same operation and effects as the leaf spring device 1 of the first embodiment can be achieved.

Also, when the two restricting protrusions 14 are provided, stress is dispersed and stress in each of the restricting protrusions 14 is alleviated, and thereby the durability of the leaf spring device 1C can be improved. Also, a contact area is increased, and thereby an effect of restricting relative rotation of the leaf springs 11 and 12 can be improved.

The number of restricting protrusions 14 is not limited to two, and three or more may be provided.

The technical scope of the present invention is not limited to the above-described embodiments, and various modifications can be made within the scope not departing from the meaning of the present invention.

For example, in the first embodiment, a configuration in which the first inclined surface 16 and the third inclined surface 18 are formed on the third side surface 23 of the recessed part 13, and the second inclined surface 17 and the fourth inclined surface 19 are formed on the fourth side surface 24 of the recessed part 13 has been described. However, at least one of the first inclined surface 16 and the third inclined surface 18 may be formed on the first side surface 21 of the restricting protrusion 14, and at least one of the second inclined surface 17 and the fourth inclined surface 19 may be formed on the second side surface 22 of the restricting protrusion 14.

For example, in the first embodiment described above, the first inclined surface 16 may be formed on the first side surface 21 of the restricting protrusion 14, and the fourth inclined surface 19 may be formed on the second side surface 22 of the restricting protrusion 14. The second inclined surface 17 may be formed on the second side surface 22 of the restricting protrusion 14, and the third inclined surface 18 may be formed on the first side surface 21 of the restricting protrusion 14.

A configuration in which the third inclined surface 18 and the fourth inclined surface 19 are not provided may be employed.

For example, in the first embodiment, the restricting protrusion 14 and the recessed part 13 may be provided to extend to an arbitrary position between the central portions of the leaf springs 11 and 12 in the longitudinal direction and both end edges of the leaf springs 11 and 12 in the longitudinal direction.

When the restricting protrusion 14 and the recessed part 13 are extended in the longitudinal direction, since a force in a lateral direction (that is, in the plate width direction) can be transmitted to the adjacent leaf springs 11 and 12, a strength of the leaf springs 11 and 12 is improved, and a lateral rigidity of the entire leaf spring device 1 is improved.

In a case in which the restricting protrusion 14 and the recessed part 13 are provided at the central portions of the leaf springs 11 and 12 in the longitudinal direction, when cross-sectional areas of the leaf springs 11 and 12 are assumed to be constant throughout the longitudinal direction, a thickness (that is, a length in the vertical direction) of the leaf springs 11 and 12 is increased at the central portion of the leaf springs 11 and 12 to reduce a width of the leaf springs 11 and 12 in the plate width direction, and the bending rigidity of the leaf springs 11 and 12 is improved. As a result, shear stress and bending stress at the central portions of the leaf springs 11 and 12 on which the bolt B is provided can be reduced, and the strength of the leaf spring device 1 is improved.

In addition, the components in the above-described embodiments can be appropriately replaced with well-known components within a range not departing from the meaning of the present invention, and the embodiments and modified examples described above may be appropriately combined.

INDUSTRIAL APPLICABILITY

According to the present invention, leaf springs adjacent to each other in a vertical direction can be inhibited from rotating relative to each other around a central axis while inhibiting bulkiness and securing durability.

REFERENCE SIGNS LIST 1, 1A, 1B, 1C: Leaf spring device
11, 12: Leaf spring
13, 213: Recessed part
14, 114, 214: Restricting protrusion
16, 216: First inclined surface
17, 217: Second inclined surface
18, 218: Third inclined surface
19, 219: Fourth inclined surface
21, 121, 221: First side surface
22, 122, 222: Second side surface
23, 223: Third side surface
24, 224: Fourth side surface
31, 231: Fifth inclined surface
32, 232: Sixth inclined surface
33, 233: Seventh inclined surface
34, 234: Eighth inclined surface
O: Central axis
X: First direction
Y: Second direction
$\theta 1$ to $\theta 8$, $\theta 21$ to $\theta 28$: Inclination angle

The invention claimed is:

1. A leaf spring device comprising a plurality of leaf springs provided to be stacked in a vertical direction, wherein
a restricting protrusion is provided on a surface of one of two leaf springs adjacent to each other in the vertical direction, a recessed part is formed on a surface of the other thereof, and the restricting protrusion is inserted into the recessed part,
a longitudinal direction of each of the restricting protrusion and the recessed part coincides with a longitudinal direction of the leaf springs when viewed from the vertical direction,
central portions of the leaf springs, the restricting protrusion, and the recessed part coincide with each other when viewed from the vertical direction,
the restricting protrusion includes a first side surface and a second side surface facing a plate width direction perpendicular to the vertical direction and the longitudinal direction, extending in the longitudinal direction, and positioned on both sides sandwiching the central portions of the leaf springs, the restricting protrusion, and the recessed part in the plate width direction when viewed from the vertical direction,
the recessed part includes a third side surface and a fourth side surface facing the plate width direction, extending in the longitudinal direction, and facing each other with the restricting protrusion sandwiched therebetween in the plate width direction, the first side surface and the third side surface face each other in the plate width direction, the second side surface and the fourth side surface face each other in the plate width direction, in a plan view from the vertical direction, an edge of a first inclined surface is formed on an edge of one side surface of the first side surface and the third side surface to become further away from an edge of the other side surface thereof in the plate width direction from a central axis passing a center of the leaf spring device toward a first direction in the longitudinal direction, and in the plan view, an edge of a second inclined surface is formed on an edge of one side surface of the second side surface and the fourth side surface to become further away from the other side surface thereof in the plate width direction from the central axis toward a second direction opposite to the first direction in the longitudinal direction.

2. The leaf spring device according to claim 1, wherein in the plan view, an inclination angle of the edge of the first inclined surface with respect to the longitudinal direction and an inclination angle of the edge of the second inclined surface with respect to the longitudinal direction when viewed from the vertical direction are the same as each other.

3. The leaf spring device according to claim 1, wherein in the plan view, an edge of a third inclined surface is formed on an edge of one side surface of the first side surface and the third side surface to be further away from an edge of the other side surface thereof in the plate width direction from the central axis toward the second direction in the longitudinal direction, and in the plan view, an edge of a fourth inclined surface is formed on one side surface of the second side surface and the fourth side surface to be further away from an edge of the other side surface thereof in the plate width direction from the central axis toward the first direction in the longitudinal direction.

4. The leaf spring device according to claim 3, wherein in the plan view, an inclination angle of the edge of the third inclined surface with respect to the longitudinal direction and an inclination angle of the edge of the fourth inclined surface with respect to the longitudinal direction when viewed from the vertical direction are the same as each other.

5. The leaf spring device according to claim 3, wherein in the plan view, the inclination angle of the edge of the first inclined surface with respect to the longitudinal direction, the inclination angle of the edge of the second inclined surface with respect to the longitudinal direction, the inclination angle of the edge of the third inclined surface with respect to the longitudinal direction, and the inclination angle of the edge of the fourth inclined surface with respect to the longitudinal direction when viewed from the vertical direction are the same as each other.

6. The leaf spring device according to claim 1, wherein
a width of the restricting protrusion in the plate width direction becomes smaller with distance away from the surface of the leaf spring, on which the restricting protrusion is formed, in the vertical direction, and
a width of the recessed part in the plate width direction becomes smaller with distance away from the surface of the leaf spring, on which the recessed part is formed, in the vertical direction.

* * * * *